US010459612B2

(12) United States Patent
Lee et al.

(10) Patent No.: US 10,459,612 B2
(45) Date of Patent: Oct. 29, 2019

(54) SELECT AND MOVE HINT

(71) Applicant: Microsoft Technology Licensing, LLC., Redmond, WA (US)

(72) Inventors: Yubeen Lee, Bellevue, WA (US); Derik Bjorn Stenerson, Redmond, WA (US); Maria Isabel-Rodriguez Carpenter, Lynnwood, WA (US); Shikha Devesh Desai, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 233 days.

(21) Appl. No.: 15/286,301

(22) Filed: Oct. 5, 2016

(65) Prior Publication Data

US 2018/0095641 A1 Apr. 5, 2018

(51) Int. Cl.
*G06F 3/0484* (2013.01)
*G06F 3/0482* (2013.01)
*G06F 3/0486* (2013.01)
*G06F 3/0488* (2013.01)

(52) U.S. Cl.
CPC ........ *G06F 3/04842* (2013.01); *G06F 3/0482* (2013.01); *G06F 3/0486* (2013.01); *G06F 3/04883* (2013.01)

(58) Field of Classification Search
CPC ............... G06F 3/04883; G06F 3/0486; G06F 3/04842; G06F 17/24; G06F 3/0482
See application file for complete search history.

(56) References Cited

U.S. PATENT DOCUMENTS

| 5,404,442 | A | * | 4/1995 | Foster | G06F 3/0481 |
| | | | | | 715/210 |
| 5,442,742 | A | * | 8/1995 | Greyson | G06F 17/24 |
| | | | | | 345/157 |
| 8,117,542 | B2 | | 2/2012 | Radtke et al. | |
| 8,451,236 | B2 | | 5/2013 | Duarte et al. | |
| 8,572,755 | B2 | | 10/2013 | Odins-Lucas et al. | |

(Continued)

OTHER PUBLICATIONS

"International Search Report and Written Opinion Issued in PCT Application No. PCT/US2017/054647", dated Dec. 22, 2017, 10 Pages.

(Continued)

*Primary Examiner* — Howard Cortes
(74) *Attorney, Agent, or Firm* — Merchant & Gould

(57) ABSTRACT

A move hint for selecting and moving content is provided. When content is selected, a move option is displayed in a context menu. A user can select the move option to move the selected content to another location in the same document or in a different document. Selecting the move option removes the selected content, and a move hint is displayed at the location where the content was removed. The move hint provides a visual clue of what is removed from the content. To insert the removed content, the user is enabled to select an insertion point and then select the move hint. On placement of the insertion point, the move hint is available to give the user a visual clue as to what will be moved to that location. Responsive to the selection of the move hint, the removed content is inserted into the document at the insertion point.

20 Claims, 19 Drawing Sheets

(56) References Cited

U.S. PATENT DOCUMENTS

| | | | |
|---|---|---|---|
| 8,650,507 B2 | 2/2014 | Westerman et al. | |
| 8,896,552 B2 | 11/2014 | Tan et al. | |
| 9,013,452 B2 | 4/2015 | Harrison et al. | |
| 9,134,892 B2 | 9/2015 | Hicks | |
| 9,189,131 B2 | 11/2015 | Thiruvidam et al. | |
| 9,274,698 B2 | 3/2016 | Fyke et al. | |
| 2009/0228792 A1* | 9/2009 | van Os | G06F 3/0488 715/702 |
| 2010/0070931 A1* | 3/2010 | Nichols | G06F 3/0488 715/863 |
| 2010/0293460 A1 | 11/2010 | Budelli | |
| 2011/0055688 A1* | 3/2011 | Isidore | G06F 9/543 715/255 |
| 2011/0239110 A1 | 9/2011 | Garrett et al. | |
| 2012/0185787 A1 | 7/2012 | Lisse et al. | |
| 2013/0019172 A1 | 1/2013 | Kotler et al. | |
| 2014/0173483 A1* | 6/2014 | Hicks | G06F 3/0486 715/769 |
| 2014/0245139 A1* | 8/2014 | Lee | G06F 3/0488 715/702 |
| 2014/0347300 A1 | 11/2014 | Ketola et al. | |
| 2015/0378600 A1 | 12/2015 | Sloan et al. | |
| 2016/0224221 A1* | 8/2016 | Liu | G06F 3/0488 |

OTHER PUBLICATIONS

Gookin, Dan, "How to Select Text for Editing on the Samsung Galaxy Tab", Retrieved on: Aug. 8, 2016 Available at: http://www.dummies.com/how-to/content/how-to-select-text-for-editing-on-the-samsung-gala.html.

* cited by examiner

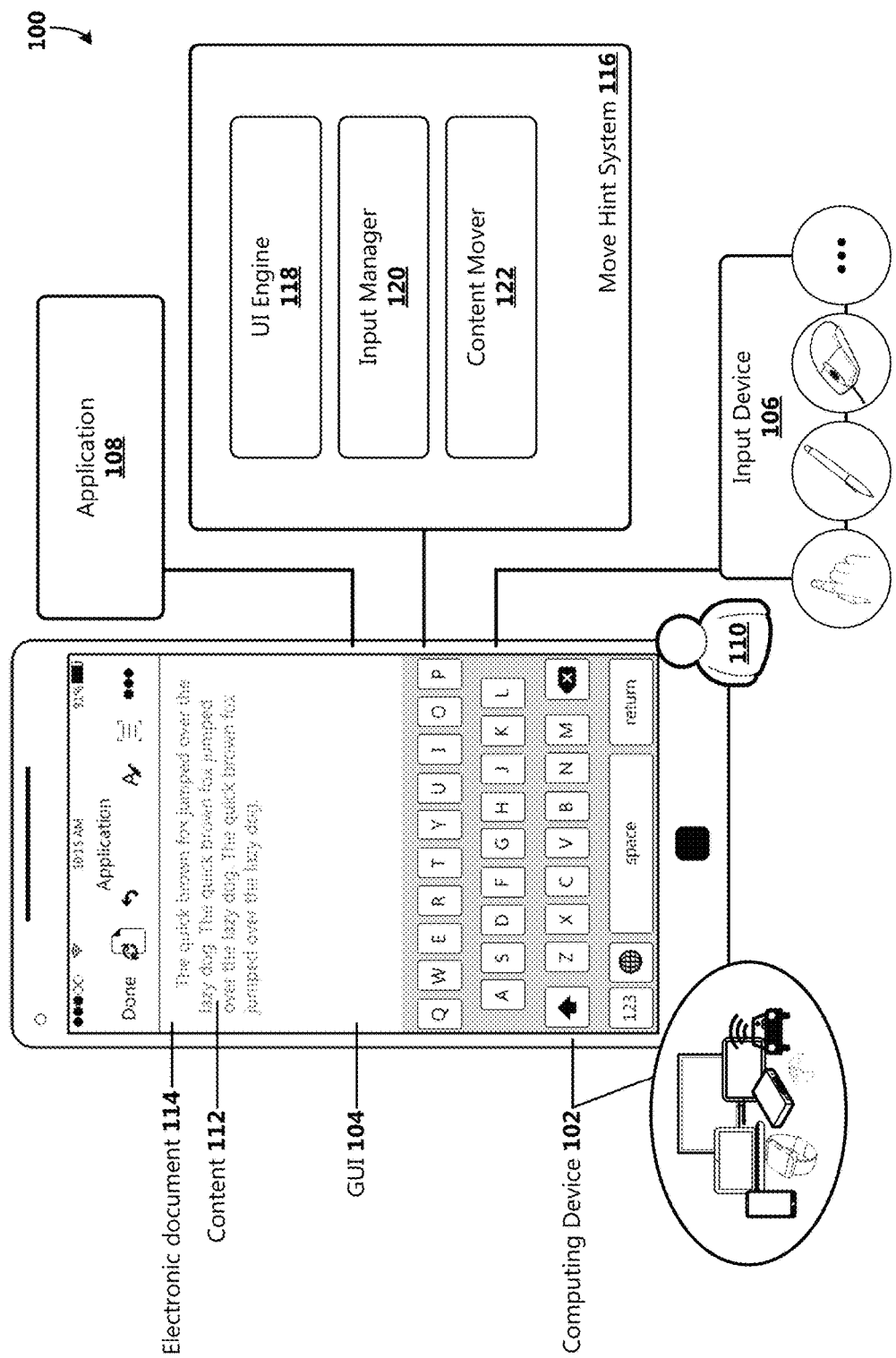

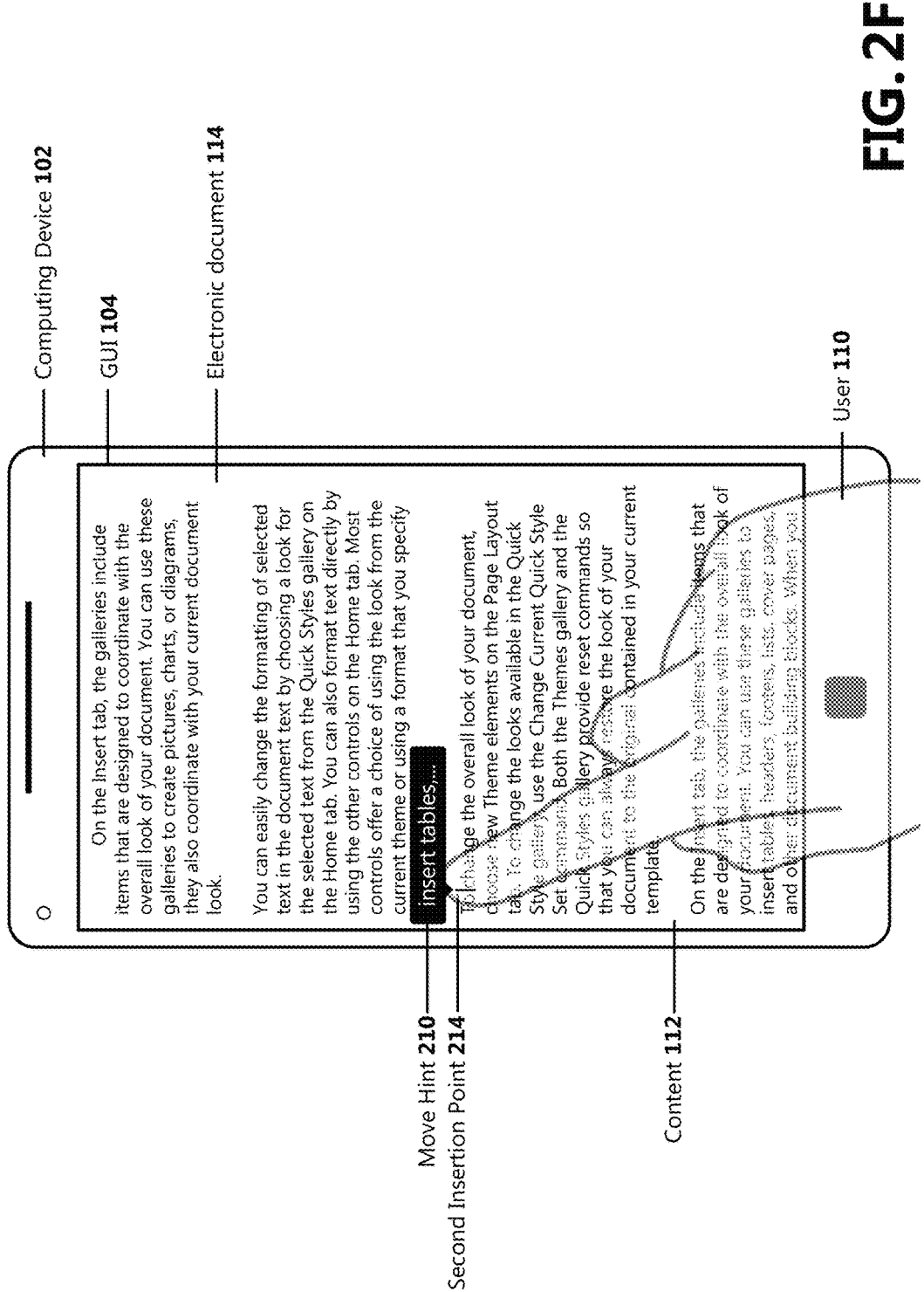

SELECT AND MOVE HINT

BACKGROUND

Computing device users have increasingly come to expect that interaction with their devices and with the content displayed on those devices will be natural and intuitive. Further, users are increasingly using small form factor devices, such as mobile phones, tablets, etc., to do light editing of documents. For example, when editing a document, users oftentimes need to select, move, and rearrange content.

Moving content in a document from one location to another (short or long distance) can be difficult. And moving content using a small form factor device can be increasingly difficult. For example, currently, when moving content (e.g., text, image) in a document, users may use cut and paste commands. However, cut and paste oftentimes does not provide users with confidence regarding where their content is after cutting. As another example, users may drag and drop content to move it. However, this can be difficult when scrolling distances after grabbing the content to drop. Additionally, users oftentimes feel that errors made while pasting result in an excessive amount of work to reselect and cut the content again. Because of this lack of trust while pasting, many users retype content, which is inefficient.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer storage media for providing a move hint for selection and movement of content. A move hint system is provided for enabling an accurate and efficient content moving experience. For example, when content is selected, a move option is provided in a context menu. A user can select the move option to move the selected content to another location in the same document or in a different document. Upon selection of the move option, the selected content is removed, and a move hint is displayed at the location where the content was removed. The move hint provides a visual clue of the particular content that will be moved. The move hint persists without it being held down (e.g., by a finger on a touchscreen device or by a click-and-hold command using a mouse). The document can be scrolled to a desired insertion location, or the move hint can be dragged to a desired location. To insert the removed content, the user is enabled to place the insertion point at the desired location to move the content to and then select the move hint. On placement of the insertion point, the move hint is available to give the user a visual clue as to what will be moved to that location. Responsive to the selection of the move hint, the removed content is inserted into the document at the insertion point.

In some examples, a copy option is provided in the context menu, which when selected, creates a copy hint that functions in a similar manner as the move hint to provide the user with confidence when he/she is copying content either within a document or between documents or applications.

The move hint provides improved user interaction and computer efficiency. The clear indication of moving content provided by the move hint enhances user confidence. Accordingly, users are more likely to use the move hint to move content rather than re-entering content or dragging and dropping content, which can be inefficient, particularly when the content is accidently dropped in a non-desired location and further steps are required for moving the content to the desired location.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 1 is a block diagram of an example operating environment including a move hint system for selecting and moving content;

FIG. 2F is an illustration showing a display of the example move hint during placement of an insertion point at a desired location;

DETAILED DESCRIPTION

Figure 2A:
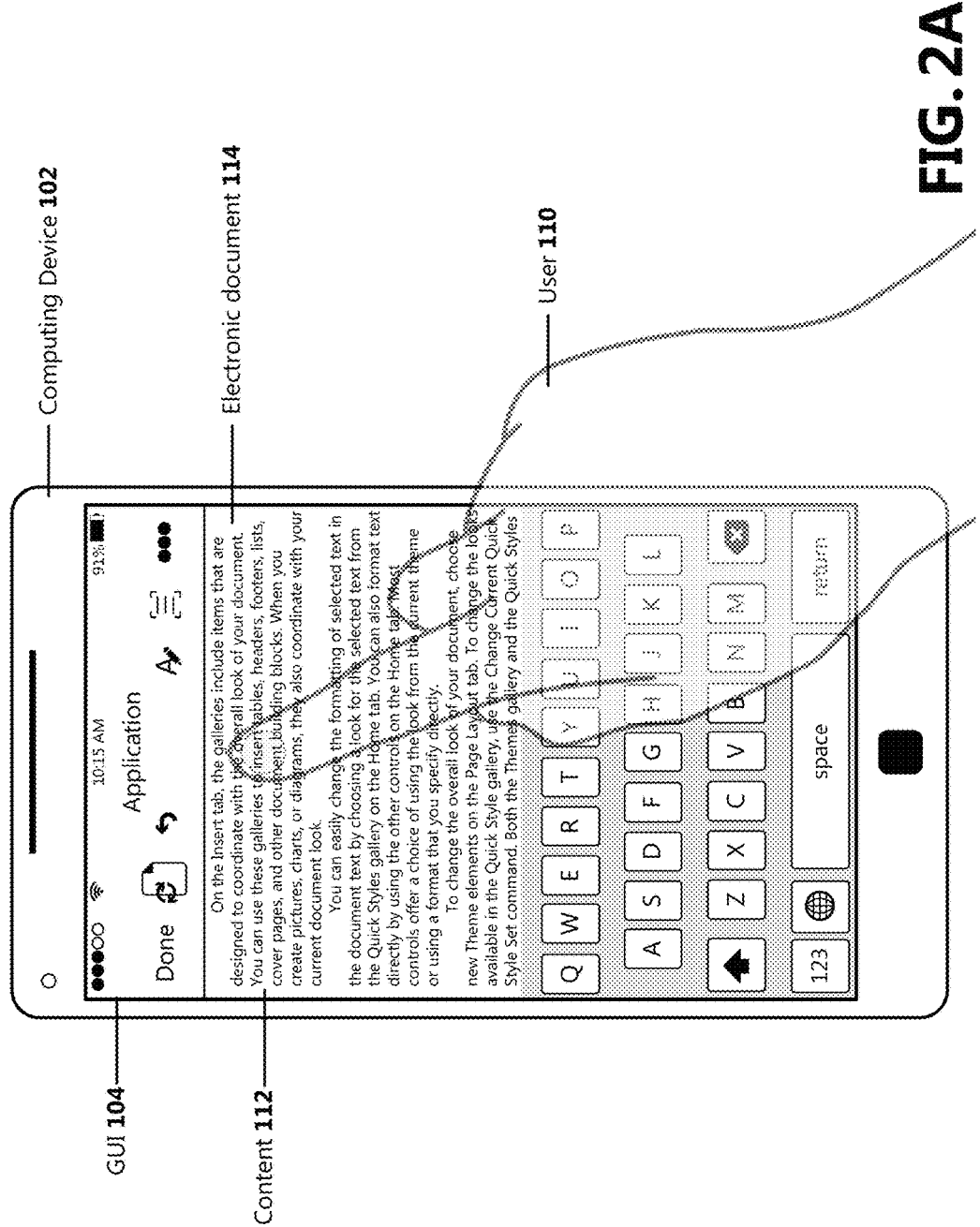
FIG. 2A is an illustration showing an example of content selection in a document displayed in an application user interface.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for selecting and moving content. With reference now to FIG. 1, an example operating environment 100 including a move hint system 116 for selecting and moving content 112 is shown. The example operating environment 100 includes a computing device 102, wherein the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, or other type of computing device) for executing applications 108 for performing a variety of tasks. The hardware of these computing devices is discussed in greater detail in regard to FIGS. 4, 5A, 5B, and 6.

A user may utilize an application 108 on a computing device 102 for a variety of tasks, which may include, for example, to write, calculate, draw, organize, prepare and view presentations, send and receive electronic mail, take and organize notes, make music, and the like. Applications 108 may include thick client applications, which may be stored locally on the computing device 102 (as illustrated in FIG. 1), or may include thin client applications (i.e., web applications) that may reside on a remote server and be accessible over a network or combination of networks (e.g., the Internet, wide area networks, local area networks). A thin client application may be hosted in a browser-controlled environment or coded in a browser-supported language and reliant on a common web browser to render the application executable on a computing device 102. According to an aspect, the application 108 is a program that is launched and manipulated by an operating system, and manages content within an electronic document 114 and published on a display screen. According to examples, a graphical user interface (GUI) 104 is provided for enabling a user 110 to interact with functionalities of the application 108 and with electronic documents 114 through manipulation of graphical icons, visual indicators, and the like.

Content/content items 112 in an electronic document 114 may vary according the application 108 used to provide the electronic document. Content items 112 may comprise one or more objects present or embedded in the electronic document 114 including, but not limited to: text (including text containers), numeric data, macros, images, links, video files, and audio files. In various aspects, the data comprising the content are stored in an elemental form by the electronic document, such as in eXtensible Markup Language (XML), Java Script Object Notation (JSON) elements, HyperText Markup Language (HTML), or another declaratory language interpretable by a schema. The schema may define sections or content items via tags and may apply various properties to content items via direct assignment or hierarchical inheritance. For example, an object comprising text may have its typeface defined in its element definition (e.g., "<text typeface=garamond>example text</text>") or defined by a stylesheet or an element above the object in the document's hierarchy from which the element depends.

With reference still to FIG. 1, an application 108 includes or is in communication with a move hint system 116 that is operative to enable selection and movement of content 112 for improved user interaction and computer efficiency. In one example, the computing device 102 includes a move hint application programming interface (API), operative to enable the application 108 to employ selection and movement of content 112 via stored instructions. According to aspects, the move hint system 116 includes: a user interface (UI) engine 118 operative to generate a display of content 112 in a GUI 104, an input manager 120 operative to receive user input, and a content mover 122 operative to select and move content in response to specific user input.

The UI engine 118 is illustrative of a software module, system, or device operative to generate a GUI display of an electronic document 114. According to an example, when an electronic document 114 is opened in an application 108, the UI engine 118 displays at least a portion of the document content 112 in a display space, such as an application window. A user 110 may selectively modify the view of the electronic document 114 in the display space, for example, by zooming in or out of the document, scrolling to another location in the document, etc. Accordingly, the UI engine 118 updates the GUI 104 to display the content within the portion of the electronic document 114 selected to be displayed in the display space.

The input manager 120 is illustrative of a software module, system, or device operative to receive user input, and communicate the user input in the form of messages. According to aspects, the user input includes a physical act or motion performed on or by an input device 106 at a position of a user-controlled cursor (such as a mouse cursor, a touch-point on a touch-screen interface, a focus-point on a motion gesture detection device, or head, eye, or gaze tracking device). Various user interface technologies may be utilized. For example, user input may be received via hardware input devices, such as mice, keyboards, remote controls, pen/stylus, and the like. As another example, user input may be received via natural input devices/methods that enable a user 110 to interact with the computing device 102 in a "natural" manner, such as those relying on speech recognition, touch and stylus recognition, gesture recognition both on screen and adjacent to the screen, air gestures, head and eye tracking, voice and speech, vision, touch, hover, gestures, and machine intelligence.

According to examples, the user 110 uses an input device 106 to select/interact with an on-screen object, such as content 112. In one example, when using a hardware input device, such as a mouse, the user 110 may provide various user inputs for selecting content 112, such as by double-clicking on the content, dragging the user-controlled cursor over the content, clicking in a margin next to the content, etc. In another example, when using a computing device 102 comprising a touchscreen display, the user 110 may select content 112 by long pressing the touchscreen display on or near the content. As another example, when using speech input, the user 110 may enter into a listening mode and speak a command, such as, "select word." As should be appreciated, the above examples are not meant to be limiting. Other user inputs for selection of content 112 are possible and are within the scope of the present disclosure. According to an aspect, the input manager 120 is operative to receive the user input, identify the position of the user-controlled cursor (e.g., mouse cursor, touch-point, focus-point), identify the input as a selection event, and post a message of the event.

In response to a selection event, the UI engine 118 is operative to update the GUI 104 to display an indication of the selected content (e.g., highlight the selected content, display drag handles at opposite ends of the selected content) and to display a context menu relating to the selected content 112. According to an aspect, the context menu includes one or more options associated with editing the selected content, wherein one of the options comprises a move option. The context menu may include options associated with other functionalities, such as a define functionality, a share functionality, etc.

In some examples, the user 110 may modify the selection. For example, the user may drag at least one of the drag handles to extend the selection to include additional content 112 or to refine the selection to include less content. According to examples, the user 110 provides another user input to select the move option. For example, the user 110 may click on the move option, touch the move option, gaze at the move option, gesture to select the move option, speak a command to select the move option, etc. The input manager 120 is operative to receive the input and communicate a move option selection event. In response, the content mover 122 is operative to cut the selected content 112 from its location in the document 114, and temporarily stores the content in a clipboard. According to one example, the content mover 122 listens for specific events, such as a move option selection event. According to another example, the input manager 120 directs a message of the move option selection event to the content mover.

The UI engine 118 is operative to update the GUI 104 to remove the selected content from the display. Further, the UI engine 118 is operative to update the GUI 104 to display a move hint proximate to the location from where the content 112 was cut/removed. According to examples, the move hint includes a portion of the removed content or an indication of the contents of the removed content 112 to both provide a hint or reminder of the removed content and to provide the user 110 with confidence that the removed content is temporarily stored and is awaiting placement by the user.

According to examples, the user 110 provides another user input to select a location to paste or move the removed content 112. According to one aspect, the user 110 may drag the move hint to a desired insertion location. According to another aspect, the user 110 may tap (e.g., when using a touchscreen device) or click (when using a mouse input device 106) to select a new insertion point within the current display of the document 114. According to another aspect and as described above, the user may modify the view of the electronic document 114 in the display space, for example, by zooming in or out of the document, scrolling to another location in the document, etc. Accordingly, the UI engine 118 updates the GUI 104 to display the content within the portion of the electronic document 114 selected to be displayed in the display space. In some examples, the user may open another application 108, or may switch to another application running on the computing device 102. When the user 110 decides on a location to insert the removed content 112, the user may provide a user input for selecting an insertion point at a location of the user-controlled cursor. For example, the user 110 may touch a location on a touchscreen display, click on a location with a mouse, gaze at a location, etc.

The input manager 120 is operative to identify the position of the user-controlled cursor (e.g., mouse cursor, touch-point, focus-point), identify the input as an insertion point selection event, and post a message of the event. In some examples, the insertion point is on a different page of the document 114 than the page from where the content 112 was removed. In some examples, the insertion point is in a different document 114 than the document from where the content 112 was removed. In some examples, the insertion point is in a different application 108 from where the content 112 was removed.

In response to the insertion point selection event, the UI engine 118 is operative to update the GUI 104 to display the move hint proximate to the position of the insertion point. According to examples, the user 110 provides another user input to select the move hint. For example, the user 110 may click on the move hint, touch the move hint, gaze at the move hint, gesture to select the move hint, speak a command to select the move hint, etc. The input manager 120 is operative to receive the input, identify the input as a move hint selection event, and post a message of the event.

Responsive to the move hint selection event, the content mover 122 is operative to insert the previously-removed content 112 into the selected document 114 at the insertion point. For example, the content mover 122 is operative to retrieve the content 112 from where it is temporarily stored (e.g., clipboard), and paste the content into the document 114 at the location of the selected insertion point. The UI engine 118 is operative to update the GUI 104 to display the pasted content 112 on the display. In some examples, the pasted content 112 is in a selected state, enabling the user 110 to move the content again, or to edit the pasted content. Further, the UI engine 118 is operative to update the GUI 104 to remove the move hint from the display. In some examples, the UI engine 118 updates the GUI 104 to re-display the context menu relating to the selected pasted content 112 (including the move option).

According to an aspect, the user 110 is enabled to selectively undo a move operation. For example, after the content 112 is pasted into the document 114, an undo option is displayed for a predetermined period of time. In response to a selection of the undo option, the UI engine 118 is operative to update the GUI 104 to remove the pasted content 112 from the display, and re-display the move hint proximate to the insertion point.

According to another aspect, the user 110 is enabled to selectively cancel a content movement operation. For example, prior to selecting the move hint for pasting the previously-removed content 112, the user may drag the move hint off the screen. Accordingly, the content 112 may be re-inserted and re-displayed at the location from where the content was removed. In some examples, a warning is displayed for notifying the user 110 that the move operation is being cancelled prior to completion of the drag movement of the move hint off the screen.

Having described an example operating environment 100, FIGS. 2A-2M are illustrations of various user interface displays showing examples of selection and movement of content 112. With reference now to FIG. 2A, an example selection of content 112 in a document 114 displayed in an application GUI 104 is illustrated. For example, in the illustrated example, the user 110 selects text by tapping or long-pressing on a word. Although the example is shown on a mobile phone, the computing device 102 may be one of various types of computing devices.

Figure 2B:
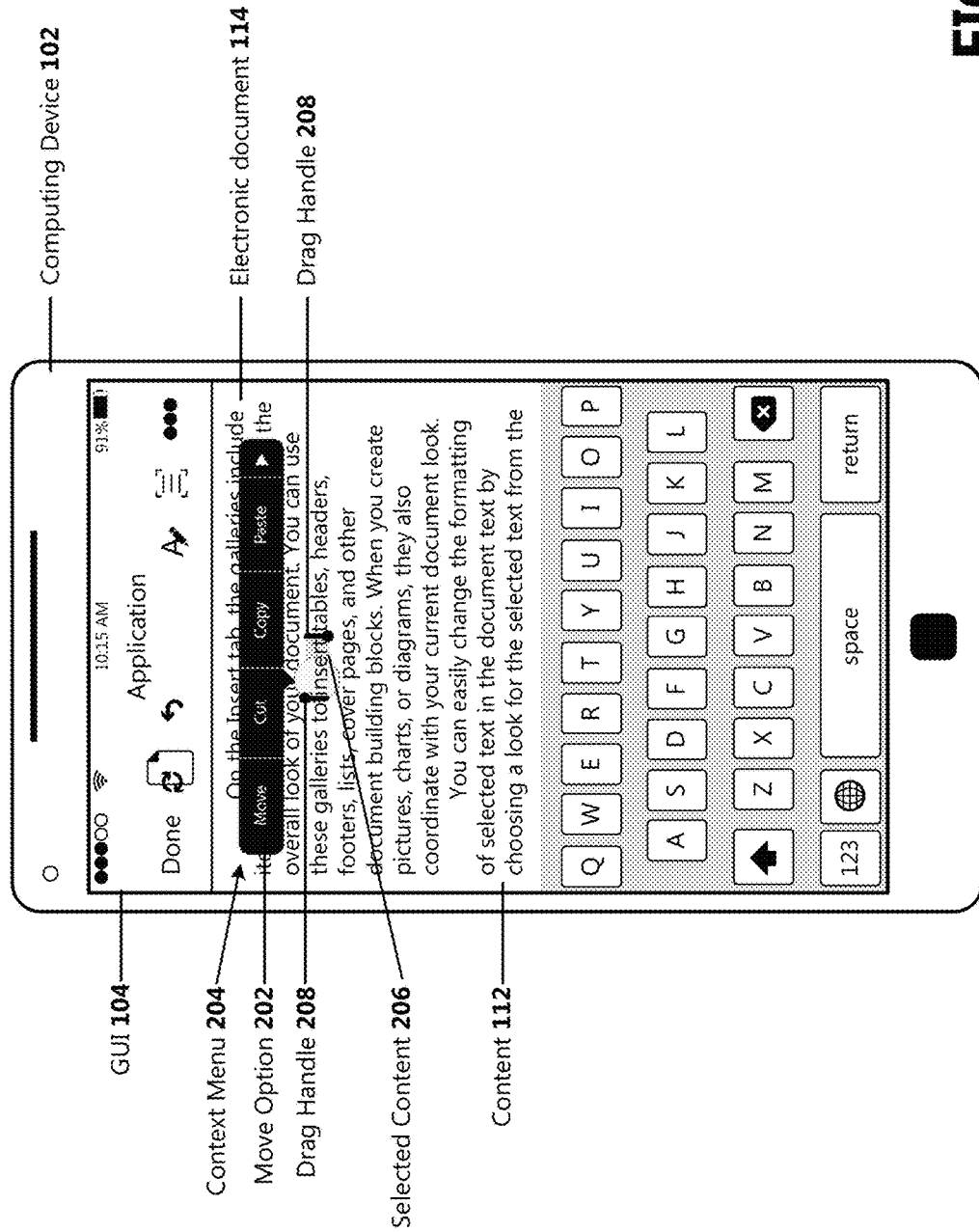
FIG. 2B is an illustration of an example move option displayed in a context menu.

With reference now to FIG. 2B, an example move option 202 is displayed in a context menu 204. For example, responsive to the selection of content (selected content 206), the context menu 204 comprising the move option 202 is displayed. As illustrated, the context menu 204 includes options associated with editing the selected content 206. In some examples, drag handles 208 are displayed at opposite ends of the selected content 206, which may be utilized to fine tune the selection.

Figure 2C:
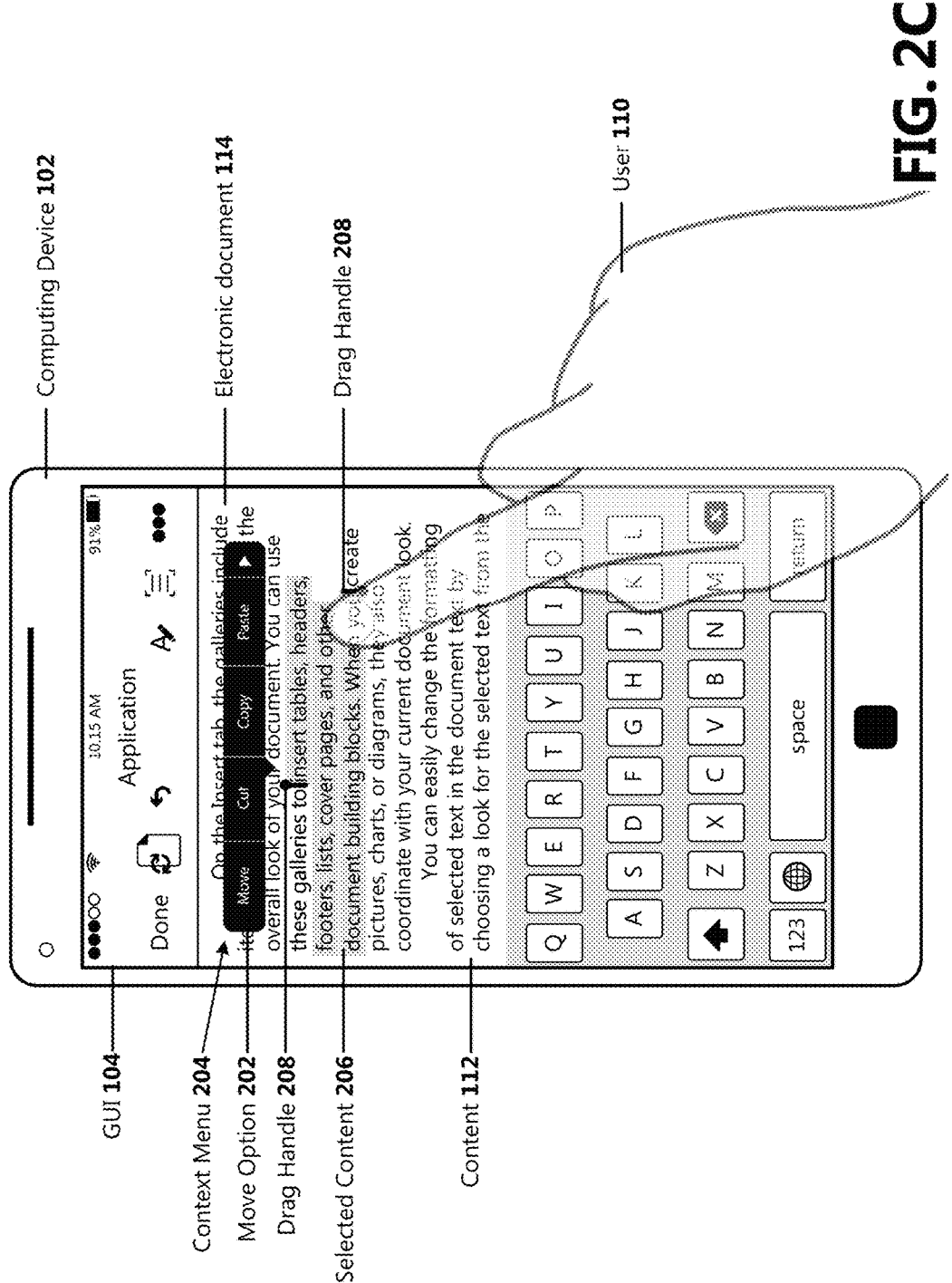
FIG. 2C is an illustration showing persistence of the example move option during selection of additional content.

As illustrated in FIG. 2C, the user 110 selects additional content (to add to the selected content 206) by dragging a drag handle 208. In some examples, dragging a drag handle 208 to the left enables selection character-by-character, dragging a drag handle to the right enables selection word-by-word, dragging a drag handle up or down enables selection of lines and paragraphs. According to an aspect and as illustrated, the context menu 204 and move option 202 continue to be displayed while the user 110 adjusts the selection.

Figure 2D:
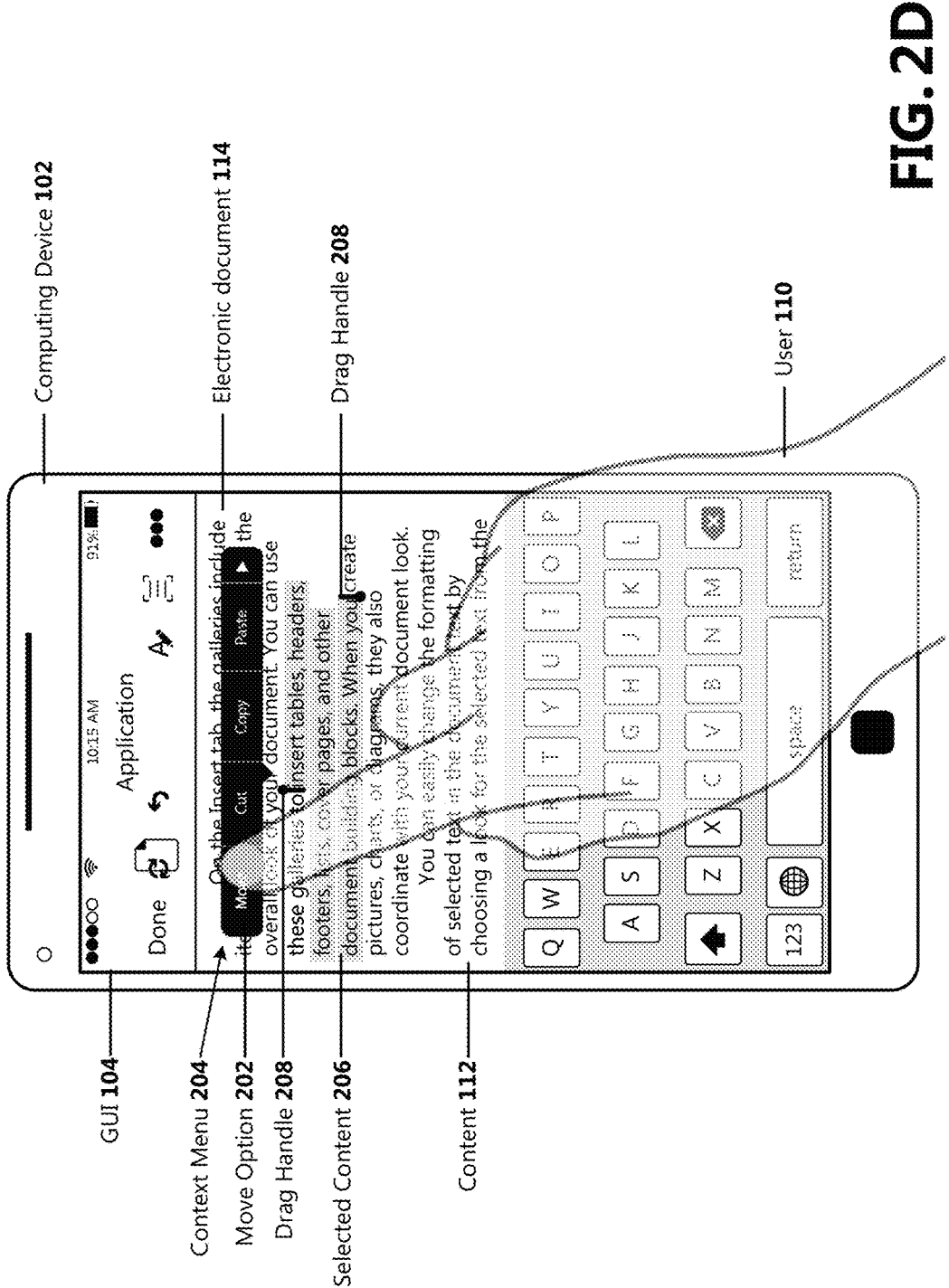
FIG. 2D is an illustration showing a selection of the move option.
Figure 2E:
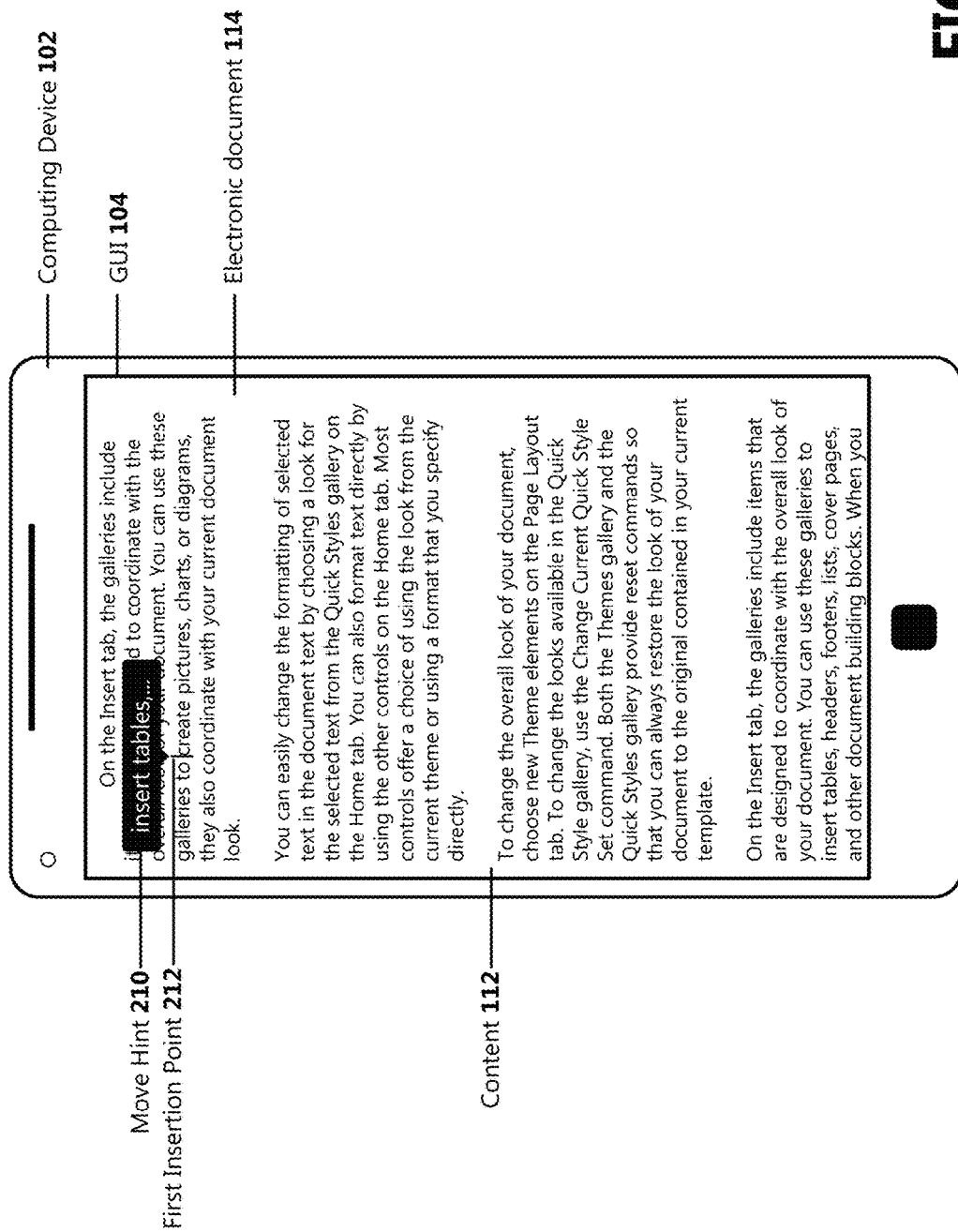
FIG. 2E is an illustration showing removal of the selected content and a display of an example move hint.

FIG. 2D shows a selection of the example move option 202 displayed in the context menu 204. As illustrated in FIG. 2E, responsive to the selection of the move option 202, the content mover 122 removes the selected content 206, which in this example is text. As illustrated, the GUI 104 is updated to remove the selected content 206 from the display. Further, the content mover 122 generates a move hint 210 comprising a relevant visualization (e.g., a preview) of the removed selected content 206 for display in the GUI 104. According to aspects, the move hint 210 provides an indication to the user 110 that the selected content 206 has been removed from the content 112, and is represented by the hint. That is, the move hint 210 provides a clear indication of what is being moved, and helps to provide the user 110 with confidence regarding the location of the removed content 206.

In some examples, the move hint 210 includes the first few characters from the removed selected content 206. In other examples, the move hint 210 includes the first word of the removed selected content 206. In other examples, the move hint 210 includes at least the first two words of the removed selected content 206. In other examples, the move hint 210 includes an image corresponding to the removed content (e.g., a thumbnail image of a removed photo or image, an icon representing a removed image, video file, or audio file). As should be appreciated, the above examples are not meant to be limiting. Other options for relevant move hint 210 visualizations corresponding to the removed selected content 206 are possible and are within the scope of the present disclosure. In some examples and as illustrated, the move hint 210 comprises a callout having a background color different from a background color of the document 114. Further, the callout comprises a stem pointing to the location from where the content 112 was cut/removed (herein referred to as a first insertion point 212).

With reference now to FIG. 2F, an illustration is provided showing a selection of a second insertion point 214 for placement of the previously-removed selected content 206. For example, the user 110 may scroll the document 114 so that the second insertion point 214 is in a different location, such as on a different page than the first insertion point 212. As illustrated, the GUI 104 is updated to display the example move hint 210 proximate to the second insertion point 214. For example, the stem of the callout may point to the second insertion point 214.

Figure 2G:
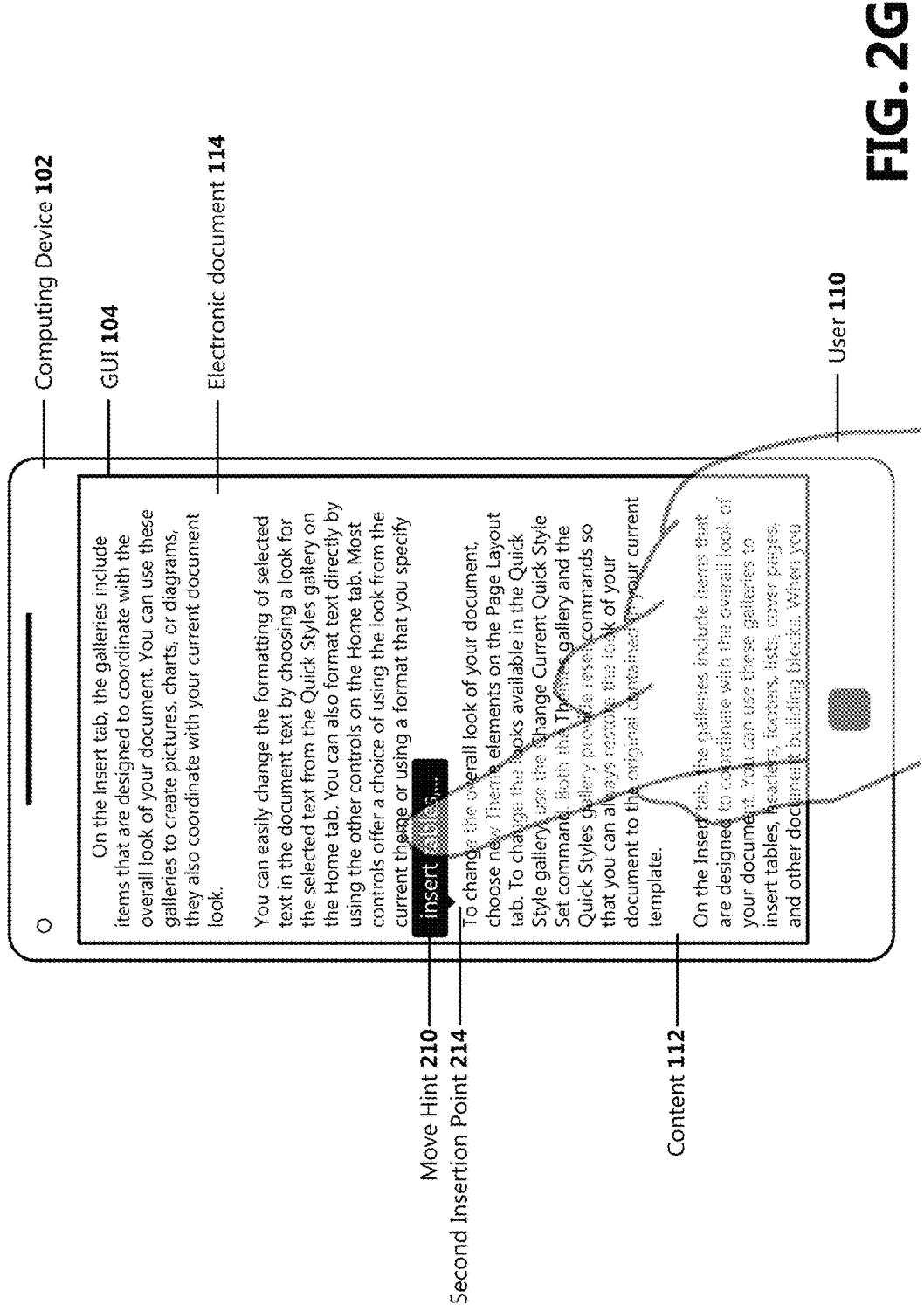
FIG. 2G is an illustration showing a selection of the example move hint.
Figure 2H:
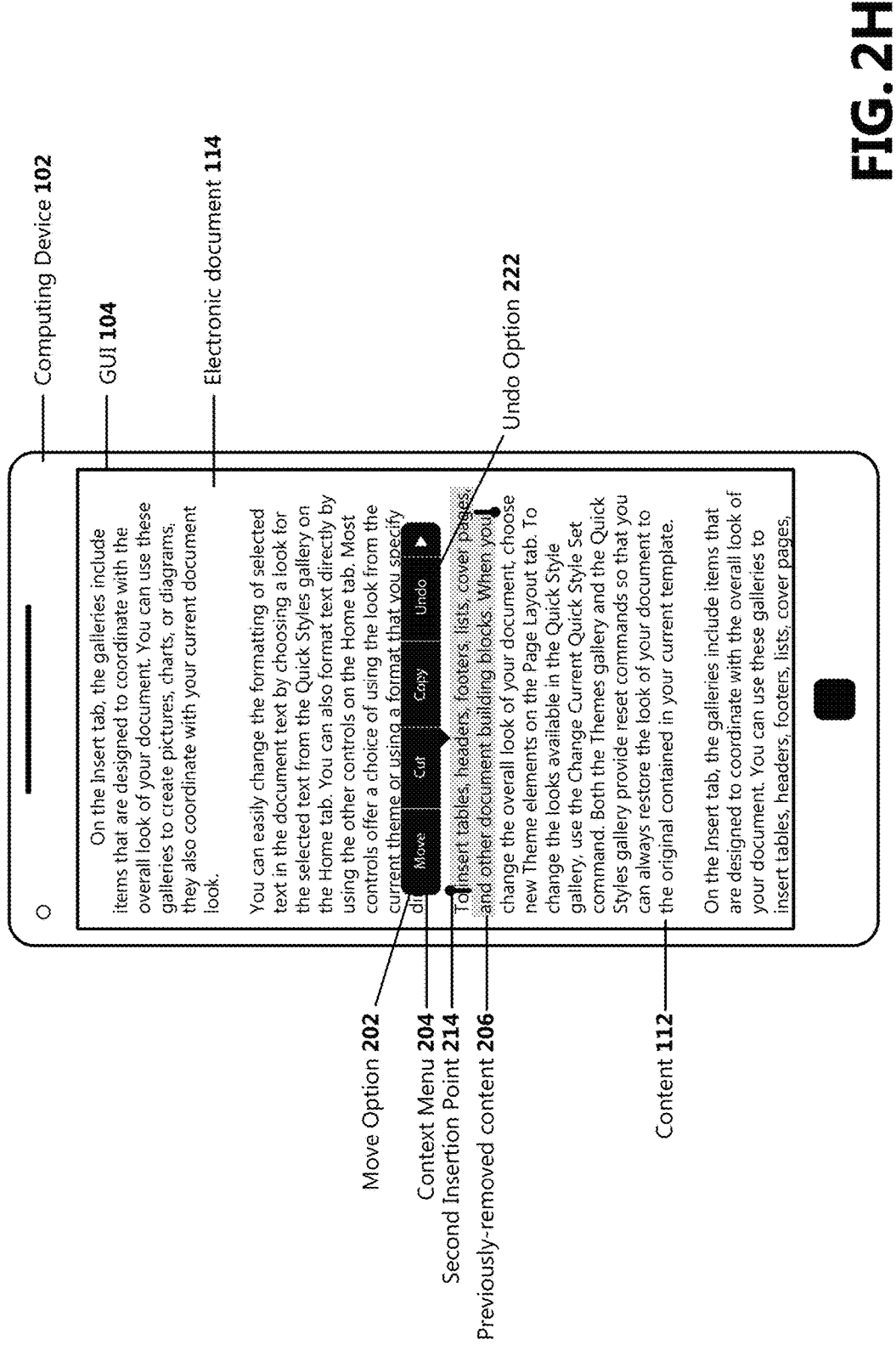
FIG. 2H is an illustration showing movement of the content to the desired location.

FIG. 2G shows a selection being made by the user 110 to insert the previously-removed selected content 206 at the second insertion point 214. For example, the user 110 selects the move hint 210 to insert the previously-removed selected content 206. Accordingly and referring now to FIG. 2H, the previously-removed selected content 206 is pasted or inserted into the document 114 at the second insertion point 214. As illustrated, according to one aspect, the previously-removed selected content 206 remains selected when it is pasted into the document 114. Further, according to another aspect, the context menu 204 is displayed proximate to the pasted selected content 206, which enables the user 110 to make edits to the pasted content or to easily select the move option 202 if the user wants to move the pasted content again. According to an example, an undo option 222 is provided and displayed in the context menu 204. For example, selection of the undo option 222 updates the GUI 104 to remove the pasted or previously-removed content 206 from the display, and the move hint 210 may be re-displayed proximate to the insertion point.

In one example, after the selected content 206 is pasted into the document 114, it remains selected for a pre-determined length of time. In another example, after the selected content 206 is pasted into the document 114, it remains selected until the user 110 makes a selection of an option in the context menu 204 or until a selection is made elsewhere in the document or application UI.

Figure 2I:
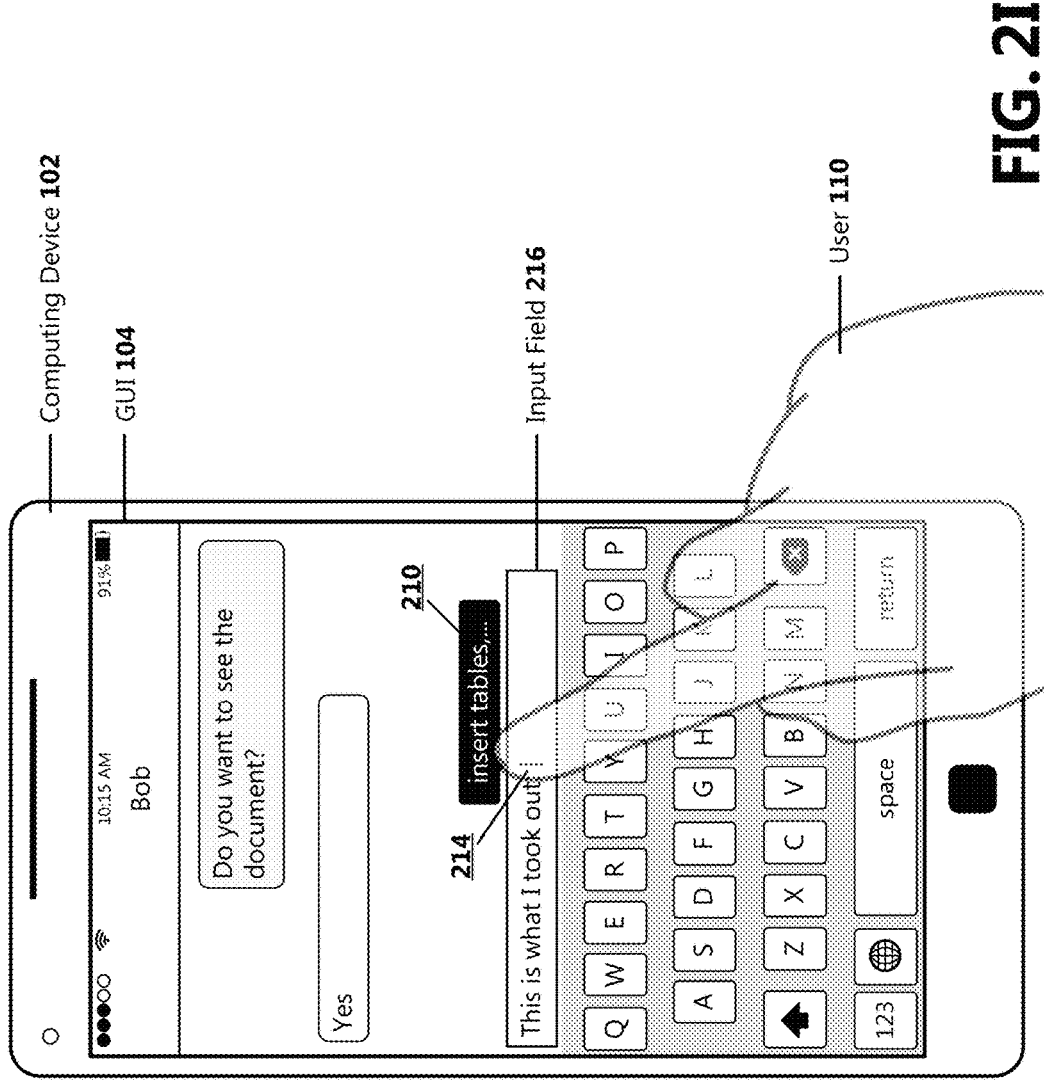
FIG. 2I is an illustration showing a display of the example move hint during placement of an insertion point at a desired location in another application user interface.

FIG. 2I is an illustration showing a display of the example move hint 210 during placement of a second insertion point 214 at a location in a GUI 104 of another application. In some examples, the user 110 may want to move selected content 206 from one document 114 in one application 108 to another document or input field 216 in another application. In other examples, the user 110 may have forgotten that he/she had previously removed content, and display of the move hint 210 may remind the user that the previously-removed selected content 206 is temporarily stored and is ready to be placed/inserted.

Figure 2J:
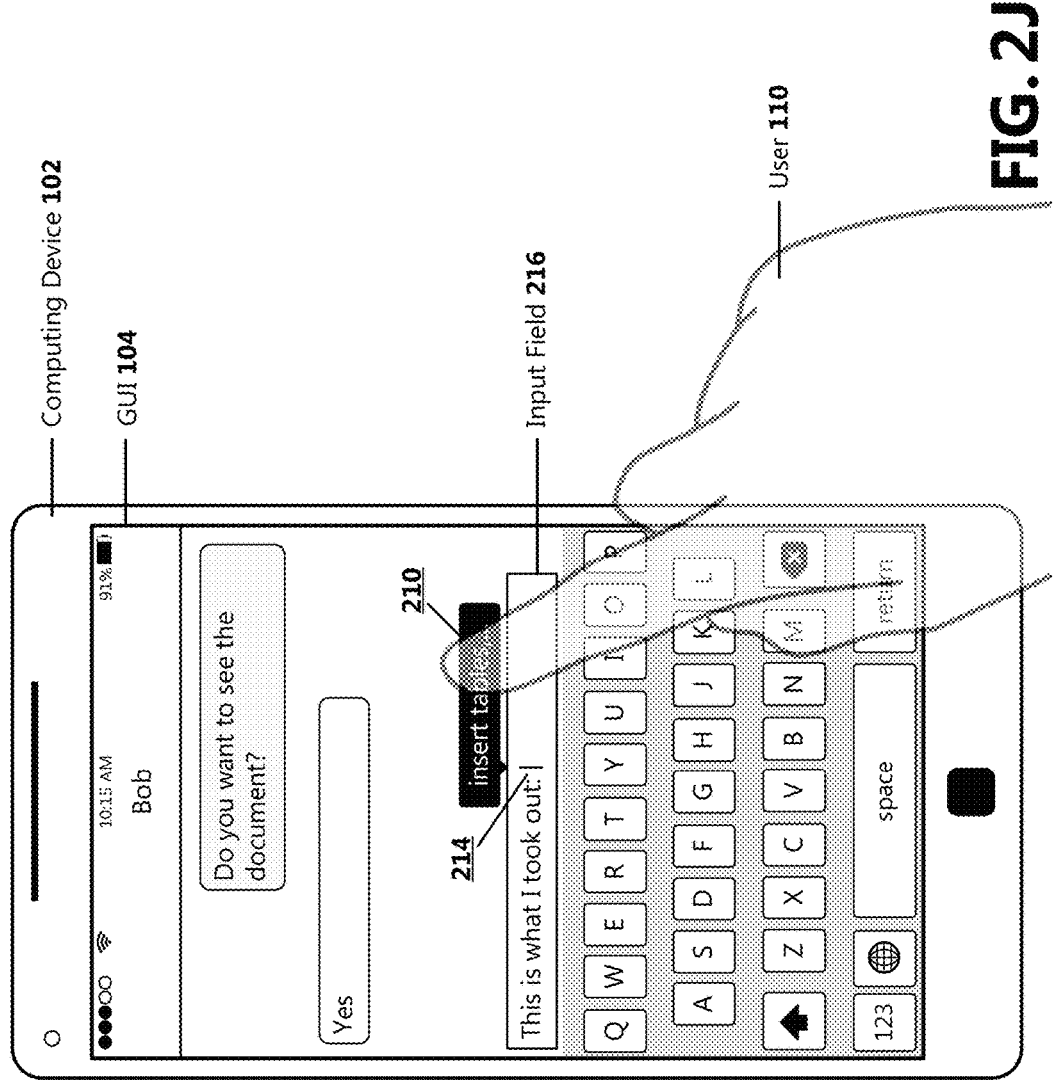
FIG. 2J is an illustration showing a selection of the example move hint.
Figure 2K:
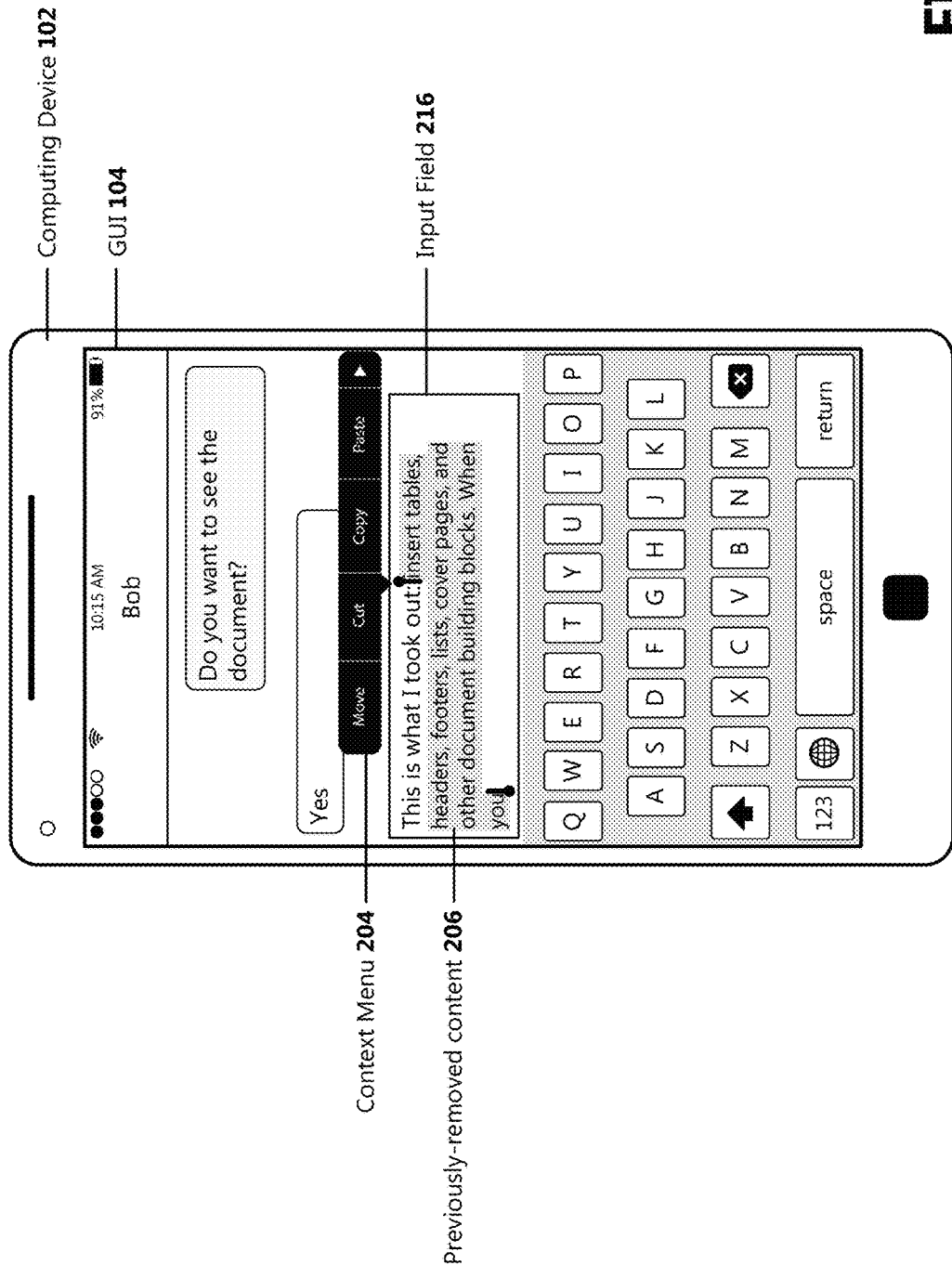
FIG. 2K is an illustration showing movement of the content to the desired location.

With reference now to FIG. 2J, the user 110 selects the move hint 210. For example, the user 110 is selectively moving content from a word processing application document (such as illustrated in the examples shown in FIGS. 2A-2H) to a text messaging application input field 216 (i.e., a text message or a text message conversation). Responsive to the user's selection and as illustrated in FIG. 2K, the previously-removed selected content 206 is pasted or inserted into the text message input field 216 at the second insertion point 214. Also as illustrated, the previously-removed selected content 206 remains selected when it is pasted into the input field 216, and the context menu 204 is displayed proximate to the pasted selected content 206.

Figure 2L:
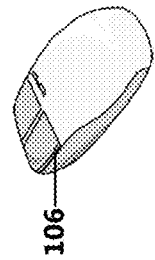
FIG. 2L is an illustration of an example copy option displayed in a context menu on an example non-touchscreen display.
Figure 2M:
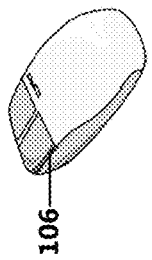
FIG. 2M is an illustration of an example copy hint displayed on the example non-touchscreen display.

FIG. 2L is an illustration of an example copy option 218 displayed on an example non-touchscreen display. While the move option 202 is discussed primarily with respect to the move hint 210, the copy option 218 is provided in response to a selection of content 206. For example, the copy option 218 is displayed in the context menu 204 with the move option 202. As illustrated in FIG. 2M, upon receiving a selection of the copy option 218, the selected content 206 is temporarily stored (e.g., in a clipboard), and a copy hint 220 is displayed that functions in a similar manner as the move hint to provide the user 110 with confidence when he is copying content either within the document 114 or between documents or applications 108.

For example, a mouse input device 106 can be used to select content to copy the content to another location, to select the copy option 218 to copy the selected content 206 from its current location at the first insertion point, to select a second insertion point 214 for selecting a location to insert the content, and to select the copy hint 220 to insert or paste the copied selected content. These examples are not to be taken in a limiting sense.

Figure 3:
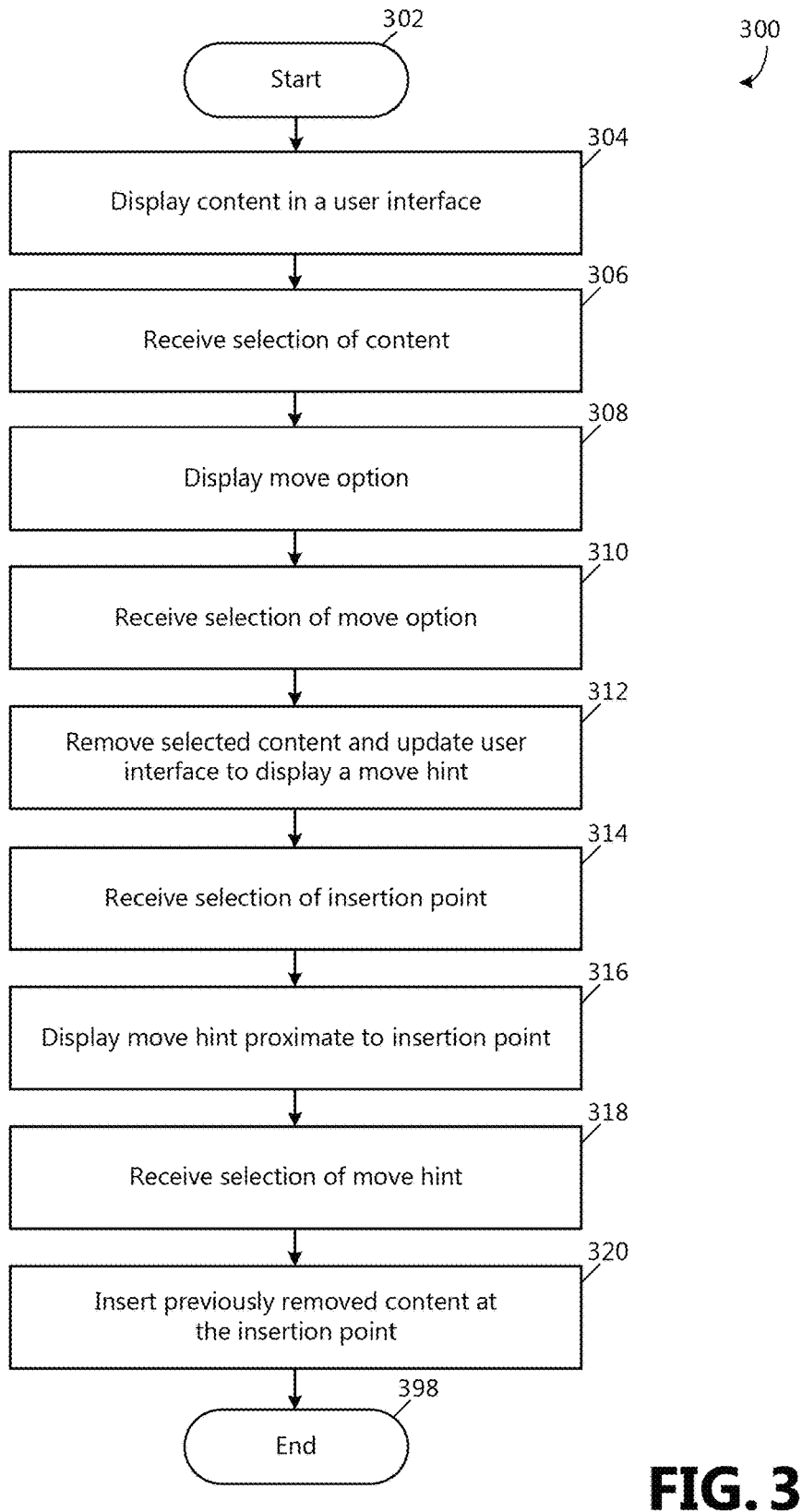
FIG. 3 is a flow chart showing general stages involved in an example method for selecting and moving content.

FIG. 3 is a flow chart showing general stages involved in an example method 300 for selecting and moving content. The method 300 starts at OPERATION 302, and proceeds to OPERATION 304, where a document 114 is opened in an application 108 on a computing device 102, and content 112 is displayed in a GUI 104 of the application.

The method 300 proceeds to OPERATION 306, where a selection of at least a portion of the content 112 is received. For example, a user 110 may place a user-controlled cursor at a first insertion point 212, and select text, numerical data, an image, an audio file, a video file, or a combination thereof. The GUI 104 may be updated to display an indication of the selection of content (e.g., the selected content 206 may be highlighted, drag handles may be displayed at opposite ends of the selected content). Further, at OPERATION 306, the user 110 may adjust the selection. For example, the user 110 may select less content or additional content.

The method 300 proceeds to OPERATION 308, where the move option 202 is displayed proximate to the selected content 206. According to some examples, the move option 202 is included in a context menu 204. At OPERATION 310, a selection of the move option 202 is received.

The method 300 proceeds to OPERATION 312, where the selected content 206 is removed, and a move hint 210 associated with the removed selected content is displayed proximate to the location from where the removed content was removed. For example, the move hint 210 provides a clear indication of what is being moved, and helps to provide confidence to the user 110 that the selected content 206 is being temporarily stored for reinsertion elsewhere after being removed.

At OPERATION 314, a selection of a second insertion point 214 is received. For example, the user 110 may place a user-controlled cursor at a location in the same document 114 or in a different document. The method 300 proceeds to OPERATION 316, where the move hint 210 is displayed proximate to the second insertion point 214, and a selection of the move hint is received at OPERATION 318.

At OPERATION 320, the previously-removed selected content 206 is inserted into the document 114 at the second insertion point 214. In some examples, when the previously-removed content is inserted, it is pasted into the document in a selected state. In some examples, the move option 202 is displayed proximate to the inserted content. The method 300 ends at OPERATION 398.

As should be appreciated, the general stages described in the above method 300 can be utilized for copying content to another location. For example, when using the above method 300 for copying content, upon selection of content 112, a copy option 218 may be displayed (OPERATION 308) and selected (OPERATION 310), the selected content 206 may be copied, and a copy hint 220 may be displayed to provide the user 110 with confidence when he/she is copying content either within a document 114 or between documents or applications 108 (OPERATION 312). Further, upon receiving a selection of an insertion point (OPERATION 314), the copy hint 220 may be displayed proximate to the insertion point (OPERATION 316), a selection of the copy hint 220 may be received (OPERATION 318), and the copied content may be inserted and displayed at the insertion point (OPERATION 320).

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
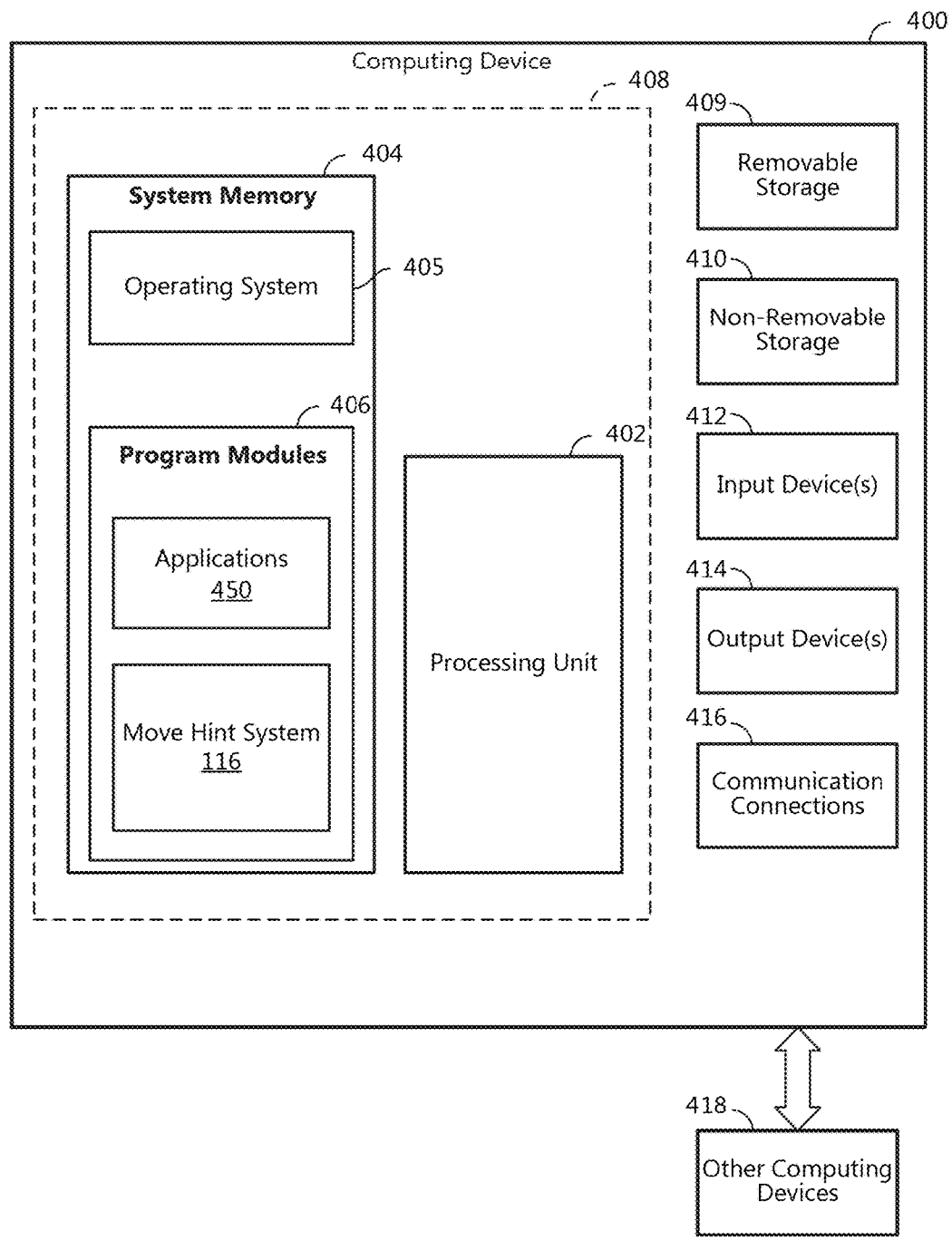
FIG. 4 is a block diagram illustrating example physical components of a computing device.
Figure 5A:
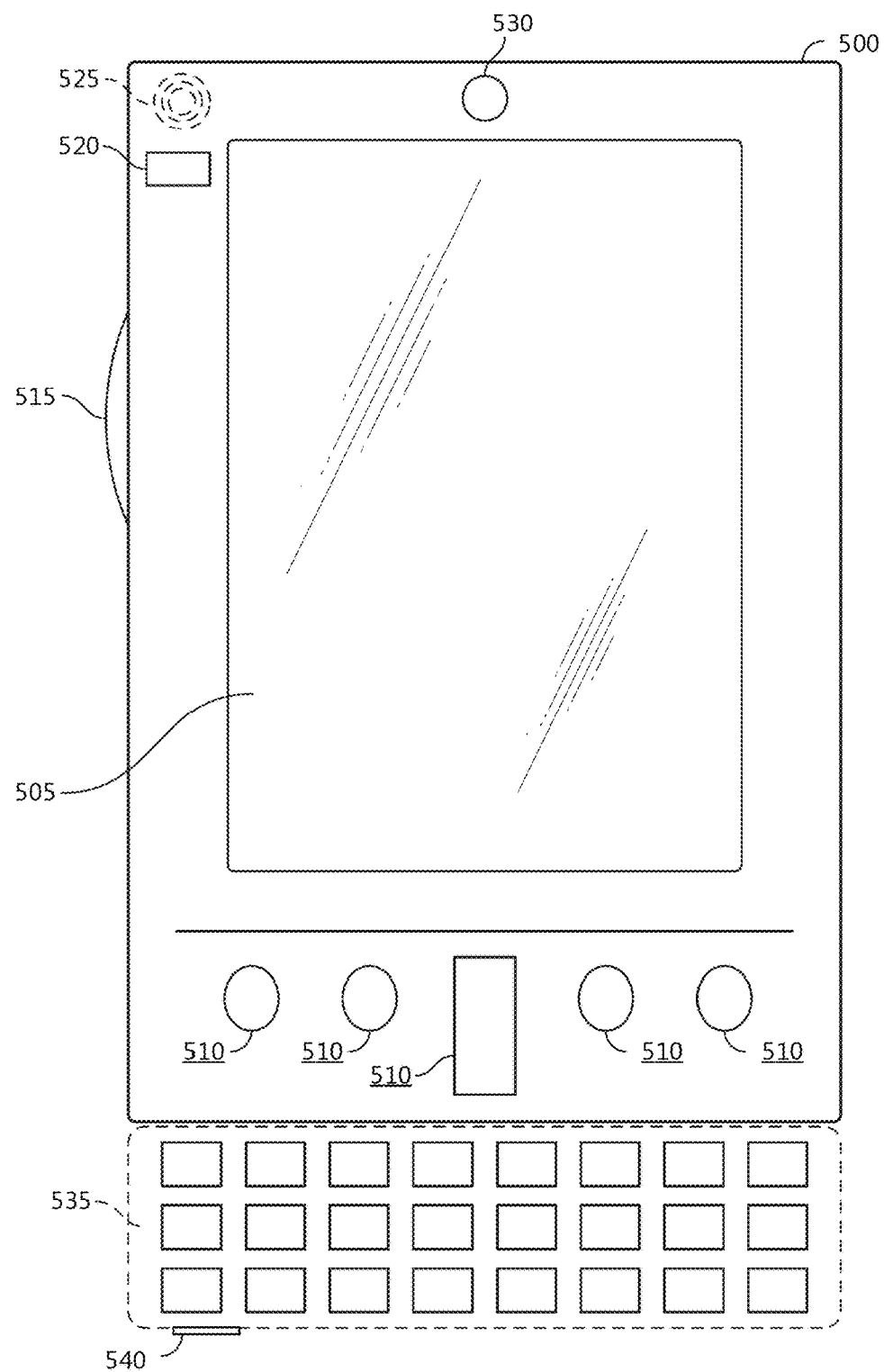
FIGS. 5A and 5B are simplified block diagrams of a mobile computing device.
Figure 5B:
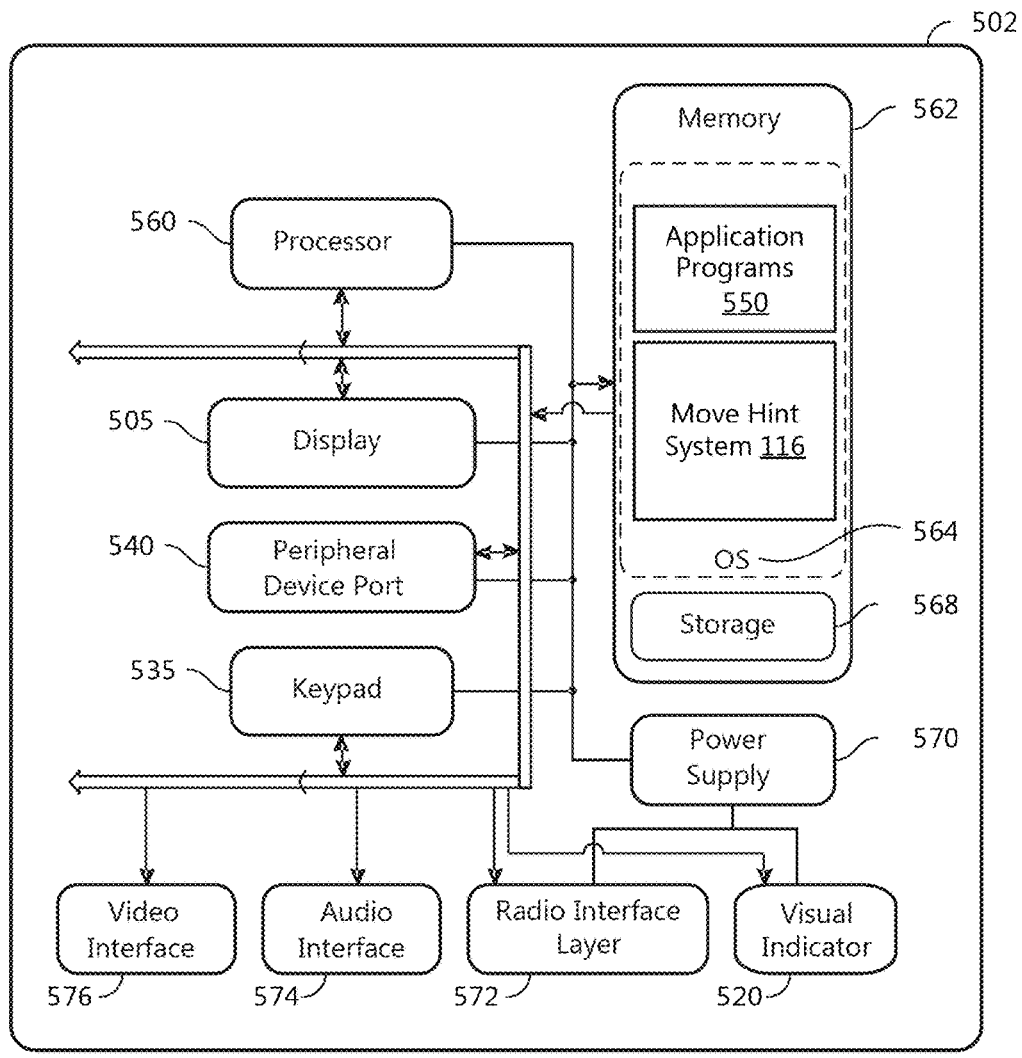
Figure 6:
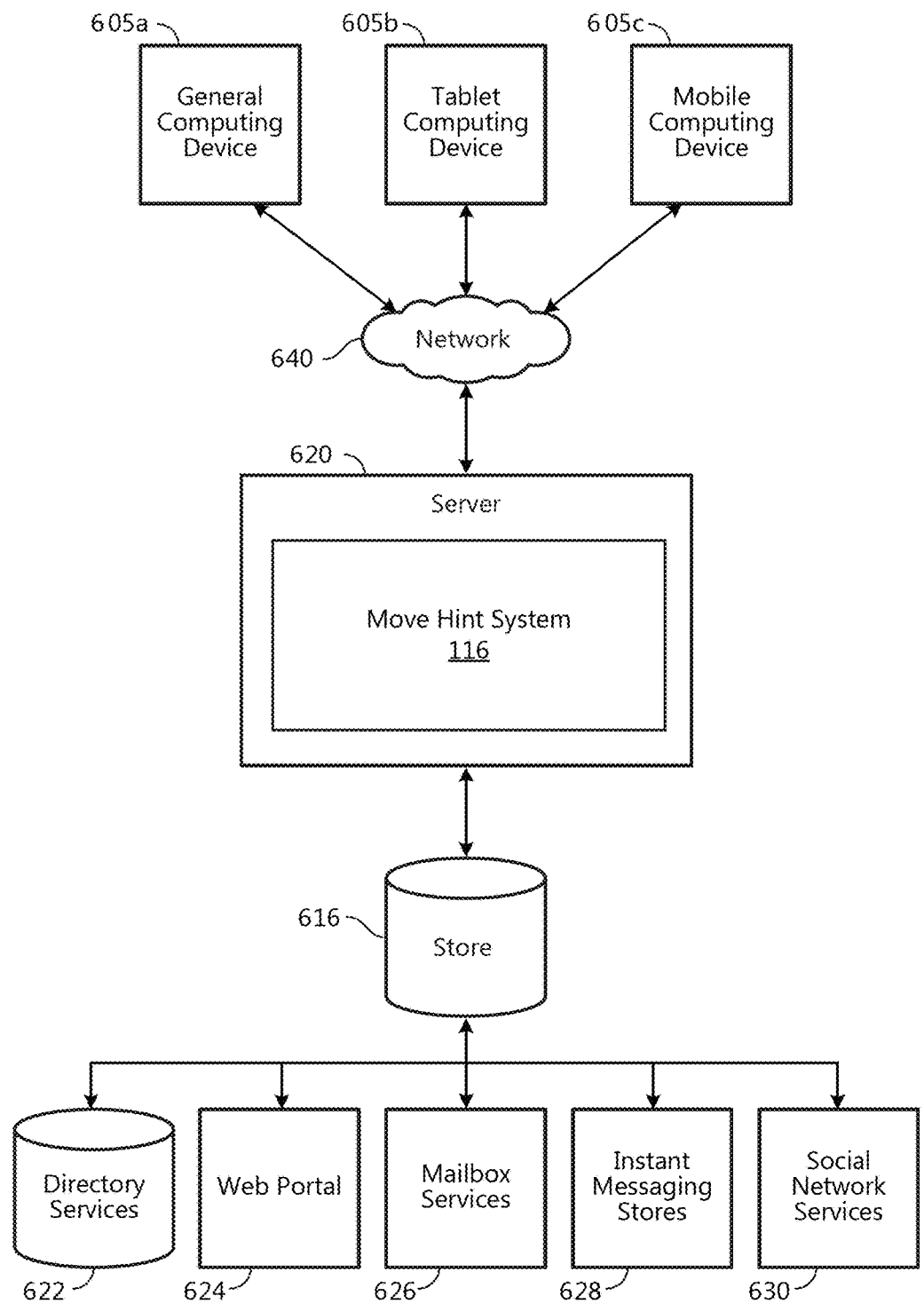
FIG. 6 is a simplified block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the move hint system 116. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, solid state drives (SSDs), or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., move hint system 116) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or less input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, the move hint system 116 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 is stored locally on the mobile computing device 500, as described above. According to another aspect, the data is stored on any number of storage media that is accessible by the device via the radio 572 or via a wired connection between the mobile computing device 500 and a separate computing device associated with the mobile computing device 500, for example, a server computer in a distributed computing network, such as the Internet. As should be appreciated such data/information is accessible via the mobile computing device 500 via the radio 572 or via a distributed computing network. Similarly, according to an aspect, such data/information is readily transferred between computing devices for storage and use according to well-known data/information transfer and storage means, including electronic mail and collaborative data/information sharing systems.

FIG. 6 illustrates one example of the architecture of a system for selecting and moving content as described above. Content developed, interacted with, or edited in association with the move hint system 116 is enabled to be stored in different communication channels or other storage types. For example, various documents may be stored using a directory service 622, a web portal 624, a mailbox service 626, an instant messaging store 628, or a social networking site 630. The move hint system 116 is operative to use any of these types of systems or the like for selecting and moving content, as described herein. According to an aspect, a server 620 provides the move hint system 116 to clients 605*a,b,c*. As one example, the server 620 is a web server providing the move hint system 116 over the web. The server 620 provides the move hint system 116 over the web to clients 605 through a network 640. By way of example, the client computing device is implemented and embodied in a personal computer 605*a*, a tablet computing device 605*b* or a mobile computing device 605*c* (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method of moving content, comprising:
   receiving a first input selecting content proximate to a first insertion point within a document;
   receiving a second input selecting a move option;
   removing the selected content;
   after removing the selected content, displaying a move hint at a first location proximate to the first insertion point, wherein the move hint includes a relevant visualization of the removed content;
   receiving a third input selecting a second insertion point;
   in response to receiving the third input, displaying the move hint at a second location proximate to the second insertion point;
   receiving a fourth input selecting the move hint; and
   in response to selection of the move hint, displaying the previously-removed content at the second insertion point.

2. The method of claim 1, wherein displaying the previously-removed content at the second insertion point comprises:
   re-selecting the previously-removed content; and
   displaying the move option to move the selected content.

3. The method of claim 1, wherein displaying the move hint comprises displaying a callout having a background color different from a background color of the document, and wherein the callout includes a stem pointing to one of the respective first and second insertion points.

4. The method of claim 1, wherein prior to receiving the second input, presenting a context menu relating to the selected content, wherein the context menu includes the move option to move the selected content.

5. The method of claim 1, wherein:
   selecting content comprises selecting text; and
   displaying the move hint comprises displaying a move hint including at least a portion of the removed text.

6. The method of claim 1, wherein receiving the third input comprises receiving a dragging input of the move hint to the second insertion point.

7. The method of claim 1, wherein receiving the third input comprises selecting the second insertion point in another document.

8. The method of claim 7, wherein:
   receiving the first input comprises selecting content proximate to the first insertion point within the document displayed in a user interface of a first application; and
   receiving the third input comprises selecting the second insertion point within the other document displayed in a user interface of a second application.

9. The method of claim 1, wherein:
   receiving the first input comprises selecting an image in the document; and
   displaying the move hint comprises displaying a thumbnail that is representative of the image.

10. The method of claim 1, further comprising cancelling a move operation and re-displaying the previously-removed content at the first insertion point in response to user input dragging the move hint off a screen on which the document is displayed.

11. The method of claim 1, further comprising displaying an undo option for a predetermined period of time, wherein selection of the undo option again removes the previously-selected content and re-displays the move hint at the second location proximate to the second insertion point.

12. A system of moving content, the system comprising a computing device, the computing device comprising:
   at least one processing device; and
   at least one computer readable data storage device storing instructions that, when executed by the at least one processing device are operative to:
      receive a first input selecting content proximate to a first insertion point within a document;
      present an option to move the selected content;
      receive a second input selecting the move option;
      remove the selected content;
      after removing the selected content, display a move hint at a first location proximate to the first insertion point, wherein the move hint includes a relevant visualization of the removed content;
      receive a third input selecting a second insertion point;
      in response to receiving the third input, display the move hint at a second location proximate to the second insertion point;
      receive a fourth input selecting the move hint; and
      in response to selection of the move hint, display the previously-removed content at the second insertion point.

13. The system of claim 12, wherein in presenting the option to move the selected content, the system is operative to present the move option in a context menu relating to the selected content.

14. The system of claim 12, wherein in displaying the previously-removed content at the second insertion point, they system is operative to:
   re-select the previously-removed content; and
   display a context menu with a plurality of options in addition to the move option to move the selected content.

15. The system of claim 12, wherein the move hint comprises a callout having a background color different from a background color of the document, and wherein the callout includes a stem pointing to one of the respective first and second insertion points.

16. The system of claim 12, wherein:
   the selected content is text; and
   the move hint comprises at least a portion of the removed text.

17. The system of claim 12, wherein the system is further operative to cancel a move operation and re-display the previously-removed content at the first insertion point in response to user input dragging the move hint off a screen on which the document is displayed.

18. The system of claim 12, wherein the system is further operative to display an undo option for a predetermined period of time, wherein selection of the undo option again removes the previously-selected content and re-displays the move hint at the second location proximate to the second insertion point.

19. A computer readable storage device including computer readable instructions, which when executed by a processing unit is operative to:

receive a first input on a touchscreen display selecting text proximate to a first insertion point within a document on the touchscreen display;

present a context menu relating to the selected text, wherein the context menu includes an option to copy the selected text;

receive a second input on the touchscreen display selecting the copy option;

copy the selected text;

after copying the selected text, display a copy hint at a first location proximate to the first insertion point on the touchscreen display, wherein the copy hint includes at least a portion of the copied text;

receive a third input on the touchscreen display selecting a second insertion point on the touchscreen display;

in response to receiving the third input, display the copy hint at a second location proximate to the second insertion point on the touchscreen display;

receive a fourth input on the touchscreen display selecting the copy hint; and in response to selection of the copy hint, display the copied text at the second insertion point.

20. The computer readable storage device of claim 19, wherein displaying the copied text further comprises:

re-selecting the copied text; and presenting the context menu with a plurality of options in addition to the copy option.

\* \* \* \* \*